R. CLAVEL.
DEVICE FOR SKIMMING OR CREAMING MILK.
APPLICATION FILED NOV. 26, 1918.
1,323,015.  Patented Nov. 25, 1919.
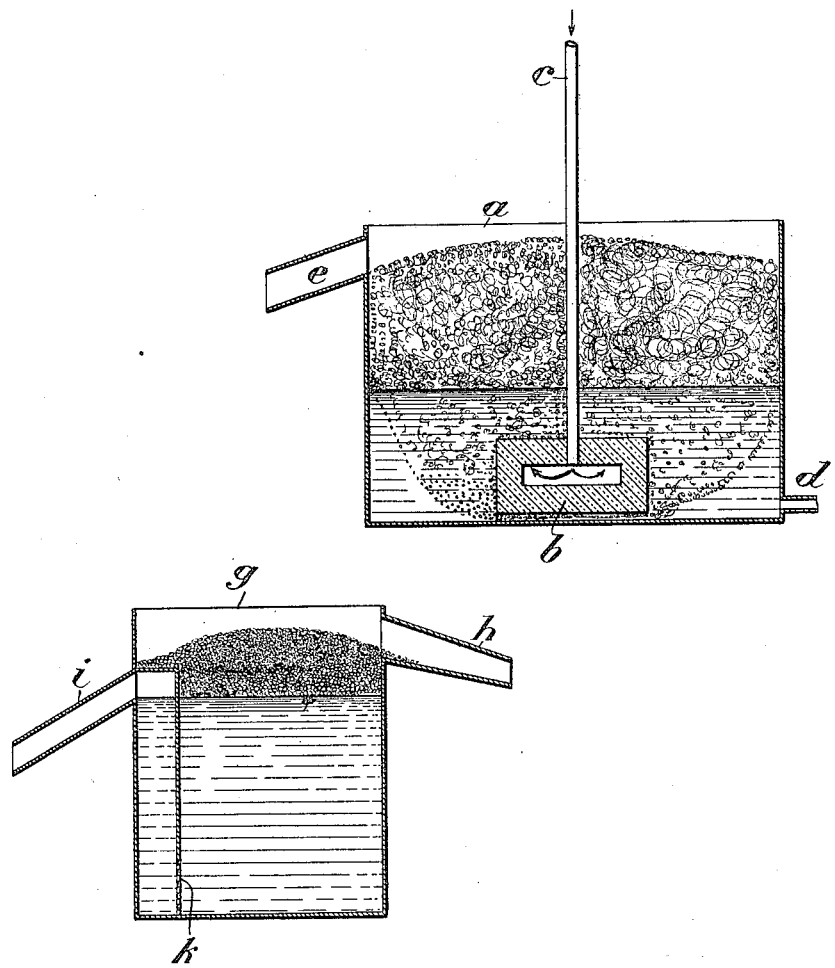
INVENTOR:
RENÉ CLAVEL
BY: H Van Oldenneel
ATTORNEY.

UNITED STATES PATENT OFFICE.

RENÉ CLAVEL, OF BASEL, SWITZERLAND.

DEVICE FOR SKIMMING OR CREAMING MILK.

1,323,015.  Specification of Letters Patent.  Patented Nov. 25, 1919.

Application filed November 26, 1918. Serial No. 264,220.

*To all whom it may concern:*

Be it known that I, RENÉ CLAVEL, a citizen of the Swiss Republic, and resident of Basel, Switzerland, have invented a new and useful Device for Skimming or Creaming Milk, of which the following is a full, clear, and exact specification.

The new device for skimming or creaming milk comprises—

(1) Means for transforming milk into foam froth by introducing gases under pressure into the said milk and for separating the cream of the foam bubbles owing to its lower surface tension from the other milk components of higher surface tension and (2) A sieve arrangement for isolating mechanically the thus separated cream from the whey by utilizing the different specific weights of both, the cream and the whey.

For the introduction of the gases into the milk there is preferably employed at least one body of finely porous material, placed into a recipient with an overflow, in order that the milk bubbles can flow into a vessel placed at a lower level. In this latter vessel the cream is separated from the whey by the bursting of the foam bubbles and two liquids of different specific weights are obtained. Hereby the cream can be conducted away by an overflow tube at the top of the vessel, while the heavier whey flows away through a sieve arranged near the bottom of the vessel and a vertical tube terminated by an outlet placed at a lower level than the cream overflow tube, whereby the cream particles withdrawn by the whey are separated from this latter.

In the accompanying drawing is shown a vertical section of an example of the new device.

This latter comprises a recipient $a$ of a capaciousness of $\frac{1}{2}$ to 1 liter into which is placed a hollow foam producing body $b$ made of porous material as, for instance, burnt clay, and which is connected to a gas supply tube $c$. The recipient $a$ is provided on the one hand with an overflow tube $e$ and on the other hand with a milk supply tube $d$, which can be connected with a Mariotte bottle maintaining the milk supply constant.

The vessel $g$ disposed below the tube $e$ is provided with two overflow tubes $h$, $i$, whereof the first $h$ serves for the outflow of the cream at the vessel top, while the second placed at a lower level serves for the outflow of the whey. $k$ designs a sieve separating the vessel $g$ from the overflow tube $i$.

The function of the device is the following:

Air is blown through the porous body $b$ in the milk supplied to the recipient $a$ and therewith transformed into foam or froth filling the recipient $a$ and wherein the milk colloids are finely dispersed. As known by the formation of milk foam or froth there results a considerable great surface, which is more enriched with the surface-active substances, as for instance the fatty bodies, as the liquid milk. But as the surface-active substances possess a lower surface tension than the surface-inactive substances, there is obtained in the foam bubbles an important accumulation of these more active substances of lower surface tension. In consequence of this surenrichment in the foam there results now by the bursting of the more viscous milk bubbles a separation of the surface-active substance, that is to say, the milk emulsion is separated in its components, albumin and fat. Thereby are produced two layers formed the upper by the cream and the lower by the whey. By the successive bursting of the foam bubbles continuously formed, there is obtained a continuous flow of cream at $h$ and a continuous flow of whey at $i$, since the specific lighter cream comes at the top of the vessel $g$, while the specific heavier whey flows away through the sieve $k$ and through the tube $i$. The skimmed milk shows a fat content of 0.1%, the surface tension of 45 dynes of the milk arising to 49 dynes in the whey, while the cream separated therefrom shows a surface tension of 40 dynes.

It may be especially pointed out, that by skimming milk with the described device, it is not further necessary to work with milk temperatures 35–45° C. and to cool it down afterward, as it is the case by skimming milk with centrifuge separators, since with the new device the whole operation can be carried out at ordinary or normal temperature, although it is advantageous to maintain the temperature as low as possible; in no case the temperature shall arise above 20° C., when operating with the new device.

The described device is intended for householding purposes; but it can also be arranged for industrial plants.

What I claim is:

1. A device for skimming or creaming milk, comprising a recipient intended to receive the milk to be skimmed and containing at least one finely porous hollow body through which a gas under pressure can be introduced in the said milk for transforming the latter into foam or froth, an overflow at the top of the said recipient and means for separating the cream from the whey after the bursting of the milk foam bubbles supplied by the said overflow.

2. A device for skimming or creaming milk comprising a recipient intended to receive the milk to be skimmed and containing at least one finely porous hollow body through which a gas under pressure can be introduced in the said milk for transforming this latter into foam or froth, an overflow at the top of the said recipient and a subjacent vessel receiving the milk foam bubbles from the said overflow and wherein the cream separating from the whey by the bursting of the said milk foam bubbles forms an upper layer swimming on the whey, the said vessel being provided at the top with an overflow for the cream and near the bottom with a sieve separating the vessel from a vertical tube by an outlet for the whey placed at a lower level than the overflow for the cream.

In witness whereof I have hereunto signed my name this 23d day of October, 1918, in the presence of two subscribing witnesses.

RENÉ CLAVEL.

Witnesses:
HELGE FRIES,
AMAND RITTER.